United States Patent
Nabuurs et al.

(10) Patent No.: US 10,457,763 B2
(45) Date of Patent: Oct. 29, 2019

(54) AQUEOUS POLYMER EMULSION

(71) Applicant: DSM IP ASSETS B.V., Heerlen (NL)

(72) Inventors: Tijs Nabuurs, Echt (NL); Jeffrey Stubbs, Echt (NL); Johannes Hendrikus De Bont, Echt (NL); Gerardus Cornelis Overbeek, Echt (NL)

(73) Assignee: DSM IP ASSETS B.V., Heerlen (NL)

( * ) Notice: Subject to any disclaimer, the term of this patent is extended or adjusted under 35 U.S.C. 154(b) by 0 days.

(21) Appl. No.: 15/550,565

(22) PCT Filed: Feb. 12, 2016

(86) PCT No.: PCT/EP2016/053084
§ 371 (c)(1),
(2) Date: Aug. 11, 2017

(87) PCT Pub. No.: WO2016/128574
PCT Pub. Date: Aug. 18, 2016

(65) Prior Publication Data
US 2018/0030186 A1    Feb. 1, 2018

(30) Foreign Application Priority Data

Feb. 13, 2015 (EP) .................... 15155037

(51) Int. Cl.
| C08F 220/00 | (2006.01) |
| C08F 222/00 | (2006.01) |
| C08F 222/14 | (2006.01) |
| C09D 135/02 | (2006.01) |
| C08F 220/06 | (2006.01) |
| C08F 220/18 | (2006.01) |

(52) U.S. Cl.
CPC .......... *C08F 222/14* (2013.01); *C09D 135/02* (2013.01); *C08F 220/06* (2013.01); *C08F 2220/1858* (2013.01)

(58) Field of Classification Search
CPC ..... C08F 222/14; C08F 220/06; C09D 135/02
See application file for complete search history.

(56) References Cited

FOREIGN PATENT DOCUMENTS

| FR | 3 007 767 | 1/2015 |
| WO | WO 2012/084977 | 6/2012 |
| WO | WO 2013/113935 | 8/2013 |

OTHER PUBLICATIONS

International Search Report and Written Opinion of the ISA for PCT/EP2016/053084, dated Jun. 6, 2016, 11 pages.

*Primary Examiner* — Michael L Leonard
(74) *Attorney, Agent, or Firm* — Nixon & Vanderhye P.C.

(57) ABSTRACT

The present invention relates to an aqueous polymer emulsion comprising at least 30 wt. % of a vinyl copolymer (A), said vinyl copolymer comprising: (I) from 10 to 90 wt. % of 2-octyl acrylate monomer; (II) from 10 to 90 wt. % of at least one itaconate ester monomer according to formula (1)

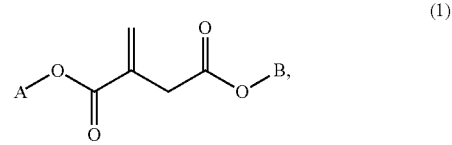

(1)

in which A and B may be different or the same and A and B are independently an alkyl group or an aryl group; and (III) from 0 to 80 wt. % of ethylenically unsaturated monomer other than (I) and (II); whereby the summed amount of (I), (II) and (III) is 100 wt. % and whereby the amount of vinyl copolymer (A) is given relative to the total weight amount of the polymers present in the emulsion.

11 Claims, No Drawings

AQUEOUS POLYMER EMULSION

This application is the U.S. national phase of International Application No. PCT/EP2016/053084 filed 12 Feb. 2016, which designated the U.S. and claims priority to EP Patent Application No. 15155037.3 filed 13 Feb. 2015, the entire contents of each of which are hereby incorporated by reference.

The present invention relates to an emulsion comprising a vinyl copolymer binder containing itaconate ester monomers, a process for making such emulsion, a coating obtained from the emulsion and a coated substrate.

There is a growing interest in utilizing renewable resources for environmentally friendly products and processes. Itaconic acid and its ester derivatives were identified as one of the valuable chemicals that can be derived from biomass, which may be potentially useful also in relation to producing "green" polymers for coating formulations. It is desired thus to manufacture resins comprising a high concentration of biorenewable raw materials, such as itaconate monomers and emulsions having a large proportion of monomers based on biobased resources that can be used in coatings, paints, lacquers, inks, overprint varnishes, film coatings, or adhesives.

However, it has been found that the use of lower alkyl diesters of itaconic acid such as dimethylitaconate and diethylitaconate in a vinyl polymer binder, in particular when present in a one-component coating composition, may result in a coating with a reduced water resistance.

The object of the present invention is to provide an aqueous emulsion of a vinyl copolymer binder containing such itaconate ester monomers which polymeric binder results in a coating of which the water resistance is not or less negatively affected by the presence of such itaconate ester monomers.

It has surprisingly been found that the use of a vinyl copolymer binder containing 2-octylacrylate in combination with itaconate ester monomers as claimed results in coatings of which the water resistance is not or less negatively affected by the presence of such itaconate ester monomers.

Accordingly, the present invention provides an aqueous polymer emulsion comprising at least 30 wt. % of a vinyl copolymer binder (A), said vinyl copolymer binder comprising:
(I) from 10 to 90 wt. % of 2-octyl acrylate monomer;
(II) from 10 to 90 wt. % of at least one itaconate ester monomer according to formula (1)

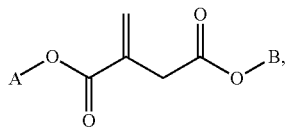

(1)

in which A and B may be different or the same and A and B are independently methyl or ethyl; and
(III) from 0 to 80 wt. % of ethylenically unsaturated monomer other than (I) and (II), whereby the summed amount of (I), (II) and (III) is 100 wt. % and whereby the amount of vinyl copolymer (A) is given relative to the total weight amount of the polymers present in the aqueous polymer emulsion.

This effect is even more surprising since the use of itaconate ester monomer according to formula (1) in combination with 2-ethylhexyl acrylate, being also an acrylate with a C8 alkyl ester group, results in the expected significant reduction of the water resistance of the coating. Replacing 2-ethylhexyl acrylate in a vinyl copolymer containing itaconate ester monomers according to formula (1) with 2-octylacrylate surprisingly results in significantly improved water resistance. In addition, the use of 2-octylacrylate instead of 2-ethylhexyl acrylate as comonomer in itaconate ester according to formula (1) containing vinyl copolymers also surprisingly results in a significant less reduction of the surface hardness due to the use of itaconate ester monomers.

A high water resistance is regarded as a very important property of a coating as migration of water through the coating may result in delamination of the coating from the substrate and/or in affecting the substrate. For example when a wooden substrate is used, a too low water resistance of the coating may result in rotting of the wooden substrate. Also the hardness of a coating is a very important coating property as it affects the mechanical properties of a coating, in particular the scratch resistance and the blocking resistance.

WO2013/113935 describes polymer beads comprising a copolymer of hydrophobic diesters of itaconic acid such as dibutylitaconate or even higher alkyl diesters of itaconic acid. This patent publication does not teach that the use of a vinyl copolymer binder containing 2-octylacrylate in combination with itaconate ester monomers as claimed results in coatings of which the water resistance is not or less negatively affected by the presence of such itaconate ester monomers.

All ranges of amounts are intended to include each and every point within the range.

The vinyl copolymer (A) preferably comprises at least 20 wt. % of 2-octyl acrylate monomer, more preferably at least 25 wt. % of 2-octyl acrylate monomer and even more preferably at least 30 wt. % of 2-octyl acrylate monomer, whereby the amount of 2-octyl acrylate monomer is given relative to the total amount of 2-octyl acrylate monomer (I) and monomers (II) and (III).

The vinyl copolymer (A) preferably comprises at most 71.5 wt. % of 2-octyl acrylate monomer, more preferably at most 55 wt. % of 2-octyl acrylate monomer. The vinyl copolymer (A) preferably comprises at most 80 wt. % of itaconate ester monomer according to formula (1), more preferably at most 70 wt. % of itaconate ester monomer according to formula (1), even more preferably at most 65 wt. % of itaconate ester monomer according to formula (1).

The vinyl copolymer comprises at least 10 wt. % of itaconate ester monomer according to formula (1), preferably at least 15 wt. % of itaconate ester monomer according to formula (1), most preferably at least 20 wt. %, whereby the amount of itaconate ester monomer according to formula (1) (monomer (II)) is given relative to the total amount of monomers (I), (II) and (III).

In a preferred embodiment of the present invention, the vinyl copolymer (A) comprises from 25 wt. % to 55 wt. % of 2-octyl acrylate monomer; from 20 wt. % to 65 wt. % of itaconate ester monomer according to formula (1) and from 0 wt. % to 55 wt. % of monomer (III).

The vinyl copolymer (A) may comprise C8-alkyl acrylate monomers different from 2-octylacrylate (as monomer (III)). However, preferably, this amount is limited and more preferably the amount of C8-alkyl acrylate monomers different from 2-octylacrylate relative to the total amount of C8-alkyl acrylate in the vinyl copolymer (A) is at most 20 wt. %, more preferably at most 10 wt. %, even more preferably at most 5 wt. % and most preferably 0 wt. %.

The vinyl copolymer (A) comprises at least one itaconate ester monomer (II) according to formula (1) where A and B are independently methyl or ethyl groups. Preferred is that A and B are identical. Most preferred is that A and B are both methyl (the itaconate ester monomer (II) then being dimethyl itaconate DMI) and/or A and B are both ethyl (the itaconate ester monomer (II) then being diethyl itaconate) Thus preferred itaconate ester monomers according to formula (1) are DMI, DEI or mixtures thereof. Especially preferred is that monomer (II) is DEI.

Preferably the vinyl copolymer (A) comprises from 10 to 89.9 wt. % of 2-octyl acrylate monomer (I); from 10 to 89.9 wt. % of itaconate ester monomer (II) as defined above; and monomer (III) in the vinyl copolymer (A) preferably comprises
(IIIa) from 0.1 to 15 wt. % of carboxylic acid functional olefinically unsaturated monomer;
(IIIb) from 0 to 5 wt. % of olefinically unsaturated crosslinkable monomer, different from (IIIa), (IIIc) and (IIId);
(IIIc) from 0 to 5 wt. % of olefinically unsaturated wet adhesion promotor monomer, different from (IIIa), (IIIb) and (IIId);
(IIId) from 0 to 79.9 wt. % of olefinically unsaturated monomer, different from (IIIa), (IIIb) and (IIIc);
whereby the amounts of (IIIa), (IIIb), (IIIc) and (IIId) are given relative to the total amount of (I), (II) and (III).

In a preferred embodiment of the present invention, the vinyl copolymer (A) comprises from 25 wt. % to 55 wt. % of 2-octyl acrylate monomer; from 20 wt. % to 65 wt. % of itaconate ester monomer according to formula (1) and monomer (III) in the vinyl copolymer (A) preferably comprises
(IIIa) from 0.1 to 15 wt. % of carboxylic acid functional olefinically unsaturated monomer;
(IIIb) from 0 to 5 wt. % of olefinically unsaturated crosslinkable monomer, different from (IIIa), (IIIc) and (IIId);
(IIIc) from 0 to 5 wt. % of olefinically unsaturated wet adhesion promotor monomer, different from (IIIa), (IIIb) and (IIId);
(IIId) from 0 to 54.9 wt. % of olefinically unsaturated monomer, different from (IIIa), (IIIb) and (IIIc);
whereby the amounts of (IIIa), (IIIb), (IIIc) and (IIId) are given relative to the total amount of (I), (II) and (III).

Monomer (IIIa) is preferably selected from the group consisting of itaconic acid, itaconic anhydride, mono-alkylesters of itaconic acid, mono-aryl esters of itaconic acid, acrylic acid, methacrylic acid, β-carboxyethyl acrylate and combinations thereof. More preferably, monomer (IIIa) is acrylic acid and/or methacrylic acid and most preferably, monomer (IIIa) is methacrylic acid.

Monomers (IIIb), (IIIc) and (IIId) are preferably selected from the group consisting of acrylates, methacrylates, arylalkylenes and any mixture thereof.

Monomer (IIIb) is at least one olefinically unsaturated crosslinkable monomer, different from (IIIa), (IIIc) and (IIId). Monomer (IIIb) contains functional groups for imparting crosslinkablilty when the aqueous polymer emulsion is subsequently dried. The functional groups for providing crosslinkability are preferably selected from epoxy, hydroxyl, ketone and aldehyde groups. Comonomer(s) with functional groups (monomers (IIIb)) for imparting crosslinkablilty is (are) preferably selected from glycidyl (meth) acrylate, hydroxyalkyl (meth)acrylates such as hydroxyethyl (meth)acrylate, acrolein, methacrolein and methyl vinyl ketone, the acetoacetoxy esters of hydroxyalkyl (meth) acrylates such as acetoacetoxyethyl (meth)acrylate, and keto-containing amides such as diacetone acrylamide. The functional group for providing crosslinkability is most preferably a ketone group. In case comonomer(s) with functional groups for imparting crosslinkablilty are applied in the present invention, the aqueous polymer emulsion is preferably combined with a crosslinking agent (i.e. so that crosslinking takes place e.g. after the formation of a coating therefrom). For example, comonomer(s) with hydroxyl functional groups for imparting crosslinkablilty are used in combination with for example a polyisocyanate as crosslinking agent. Comonomer(s) with functional groups for imparting crosslinkablilty comprising ketone and/or aldehyde functional groups are used in combination with for example a polyamine or a polyhydrazide as crosslinking agent. An example of a suitable polyamine is isophorone diamine or a polyalkylene imine such as polyethylene imine, for example obtainable from BASF under the trade name Lupasol®. Examples of suitable polyhydrazides are adipic acid dihydrazide, oxalic acid dihydrazide, phthalic acid dihydrazide and terephthalic acid dihydrazide. A preferred polyhydrazide is adipic acid dihydrazide. A preferred combination of crosslinking agent and functional group for imparting crosslinkablilty when the aqueous polymer emulsion is subsequently dried is the combination of adipic acid dihydrazide as crosslinking agent and at least one ketone group present in the comonomer with functional groups for imparting crosslinkablilty. Diacetone acrylamide (DAAM) is a preferred comonomer with ketone functional groups for use in combination with adipic acid dihydrazide. However in one embodiment of the present invention advantageously the vinyl copolymer (A) used in the present invention is substantially free of, more advantageously have no, monomers (IIIb).

Monomers which may further improve the wet adhesion (monomer (IIIc), different from (IIIa), (IIIb) and (IIId)) may further be used. Conveniently further improved wet adhesion may be obtained by copolymerization of at least one monomer selected from the group consisting of:
i) ketone or acetoacetoxy functional olefinically unsaturated monomer [such as DAAM (diacetone acrylamide), AAEM (acetoacetoxy ethylmethacrylate) and/or mixtures thereof],
ii) ureido functional olefinically unsaturated monomer, such as those available commercially under the trade names Plex 6852-0, Evonik, combinations and/or mixtures thereof),
iii) tertiary-amine functional olefinically unsaturated monomer [such as DMAEMA (dimethylamine ethylmethacrylate), and/or DMAEA (dimethylamine ethylacrylate)], and/or
iv) any suitable combination of i), ii) and iii) and/or mixtures thereof.

However in one embodiment of the present invention advantageously the vinyl copolymer (A) used in the present invention is substantially free of, more advantageously have no, further wet adhesion promoting groups.

Monomer (IIId) is preferably selected from the group consisting of methyl (meth)acrylate, ethyl (meth)acrylate, butyl (meth)acrylate, styrene and combinations thereof.

By a vinyl copolymer herein is meant a copolymer derived from the addition polymerisation (using a free radical process) of at least monomers (I) and (II), being olefinically unsaturated monomer having a polymerisable carbon-carbon double bond. By a vinyl monomer is therefore meant herein an olefinically unsaturated monomer.

Vinyl copolymer (A) is preferably obtained by solution, emulsion or suspension polymerization. In case vinyl copolymer (A) is obtained by solution polymerization, the applied solvent, preferably a volatile solvent, is removed during and/or after emulsification of vinyl copolymer (A). Preferably the process to prepare the aqueous polymer emulsion according to the invention is free of organic solvent. As such, vinyl copolymer (A) is preferably obtained by emulsion or suspension polymerization. Most preferably vinyl copolymer (A) is obtained by emulsion polymerization, preferably vinyl copolymer (A) is obtained in an aqueous emulsion polymerisation process. Such an aqueous emulsion polymerisation process is, in itself, well known in the art and need not be described in great detail. Suffice to say that such a process involves polymerizing the monomers in an aqueous medium and conducting polymerisation using a free-radical yielding initiator and (usually) appropriate heating (e.g. 30 to 120° C.) and agitation (stirring) being employed. The aqueous emulsion polymerisation can be effected using one or more conventional emulsifying agents, these being surfactants. Anionic, non-ionic, and anionic-non-ionic surfactants can be used, and also combinations of the three types; cationic surfactants can also be used.

In case the vinyl polymer (A) is prepared via emulsion polymerization, the radical polymerization to obtain vinyl copolymer (A) is conducted using a free radical initiator, appropriate heating and agitation (stirring). The polymerisation can employ conventional free radical initiators [e.g. hydrogen peroxide, t-butyl-hydroperoxide, cumene hydroperoxide, persulphates such as ammonium, potassium and sodium salts of persulphate; redox systems may be used; combinations such as t-butyl hydroperoxide isoascorbic acid and FeEDTA are useful; the amount of initiator, or initiator system, is generally 0.05 to 3% based on the weight of total monomers charged. The molecular weight of vinyl copolymer (A) can be controlled by the use of well-known chain transfer agents. Preferred chain transfer agents can include mercaptanes and alkyl halogenides. More preferred, the chain transfer agent is selected from the group of lauryl mercaptane, 3-mercapto propionic acid, i-octyl thioglycolate, mercaptoethanol, tetrabromo methane, or tribromo methane. Most preferred the chain transfer agent is a mercaptane, selected from the group of lauryl mercaptane, 3-mercapto propionic acid, i-octyl thioglycolate, and mercaptoethanol.

The acid value of the vinyl copolymer (A) is preferably at most 50 mg KOH/g of vinyl copolymer, more preferably of at most 40 mg KOH/g, and most preferably between 5 and 28 mg KOH/g of vinyl copolymer.

The amount of vinyl copolymer (A) in the aqueous polymer emulsion is at least 30 wt. %, preferably at least 50 wt. %, more preferably at least 70 wt. %, whereby the amount of vinyl copolymer (A) is given relative to the total weight amount of the polymers present in the emulsion.

The polymerization of the vinyl monomers to form the vinyl polymer can be run in different ways. One can envisage straight emulsions, with only one monomer feed, sequential polymers resulting in a phase separated particle morphology, and oligomer-polymer emulsions where preferably one of the polymer phases contains significantly more acid functionality than the other phase(s).

The vinyl copolymer (I) may have a phase separated particle morphology obtained by the polymerization of at least a first monomer feed and a different second monomer feed and at least one of the first and second monomer feed comprises 2-octyl acrylate monomer and itaconate ester monomer according to formula (1), resulting in vinyl copolymer (A). In case a vinyl polymer is produced comprising as one of the phases vinyl copolymer (A), preferably, the at least two monomer feeds differ in glass transition temperature (Tg) by at least 20° C., more preferably by at least 40° C. The at least two monomer feeds preferably differ in acid value, preferably one monomer feed has an acid value of at least 13 mg KOH/g of polymer and the other monomer feed preferably has an acid value of no more than 13 mg KOH/g of polymer. The first monomer feed preferably comprises 2-octyl acrylate monomer, itaconate ester monomer according to formula (1) and acid functional monomer and the second monomer feed does not contain acid functional monomer.

An emulsion polymerisation for making the vinyl polymer may be carried out using an "all-in-one" batch process (i.e. a process in which all the materials to be employed are present in the polymerisation medium at the start of polymerisation) or a semi-batch process in which one or more of the materials employed (usually at least one of the monomers) is wholly or partially fed to the polymerisation medium during the polymerisation. In-line mixing for two or more of the materials employed may also be used.

The vinyl monomers for making the vinyl copolymer (A) are preferably polymerised via a seeded radical polymerisation, although this is not intended to limit the invention. The seed can be formed in-situ, meaning that part of the monomer feed is first allowed to polymerise, before the bulk of the monomer feed is added, or can be prepared separately. In this latter case an emulsion, either prepared via emulsion polymerisation or solution-dispersion polymerisation, is used as seed.

In a particularly preferred embodiment of the invention, the vinyl copolymer (A) is present as a single polymer phase in the aqueous polymer emulsion according to the invention.

The pH of the final polymer emulsion comprising vinyl copolymer (A) is preferably between 5 and 9, more preferred between 7 and 9. In the case of an emulsion polymerization process, the pH is raised preferably during the monomer feed or at the end of the polymerization using ammonia, organic amines or inorganic bases. Preferred bases are ammonia, dimethyl ethanol amine, and lithium, sodium, or potassium hydroxide salts. The most preferred base is ammonia.

The residual monomer level of the aqueous polymer emulsion (as determined with head-space gas chromatography) is preferably less than 2500 ppm, more preferably less than 1500 ppm and even more preferably less than 750 ppm.

The present invention further relates to a coating or paint composition comprising an aqueous polymer emulsion according to the present invention and preferably further comprising solvents, pigments, dyes, heat stabilisers, defoamers, fillers, matting agents, UV absorbers and/or antioxidants. The coating or paint composition of the invention comprises at least the aqueous polymer emulsion according to the invention. The coating or paint composition of the invention may also further comprise a second polymer emulsion preferably selected from the group consisting of a polyurethane emulsion, an alkyd emulsion, or an emulsion containing a vinyl polymer different from vinyl copolymer (A).

Preferably, the coating or paint composition according to the invention is a one-component, non-crosslinkable composition, which, in the context of the present invention, is understood as a coating composition which does not need to be subjected to crosslinking upon drying to obtain a coating. Thus the coating composition that is applied to a substrate does not need to contain a crosslinking component to obtain a coating, and thus the pot-life of one-component coating composition is longer than of coating composition to which a crosslinking component needs to be added in order to obtain a coating.

The present invention further relates to a method of coating or painting a substrate comprising applying a coating or paint composition according to the invention to a substrate and causing or allowing the aqueous carrier medium of the emulsion to be removed. The coating or paint composition according to the invention may be applied to a wide variety of substrates. Preferred substrates are wood optionally containing a primer and a midcoat, metal, plastic, leather, glass, paper or a combination of at least two of these materials. The present invention further relates to a coated or painted substrate obtained by this method.

The present invention is now further illustrated but in no way limited by reference to the following examples. Unless otherwise specified all parts, percentages, and ratios are on a weight basis.

EXAMPLES AND COMPARATIVE EXPERIMENTS

Abbreviations

2-OA 2-octyl acrylate
2-EHA 2-ethylhexyl acrylate
DMI dimethyl itaconate
MMA methyl methacrylate
MFT minimum film formation temperature
Proxel AQ 10 wt-% solution of 1,2-benzisothiazolin-3-one neutralized with KOH in water; obtained from Lonza
KOH potassium hydroxide Example 1: Copolymer Emulsion Comprising 2-OA and DMI To a round-bottomed flask equipped with a condenser, thermometer, and a stirrer were charged 400.6 parts of demineralized water which were heated to 50° C. During heat-up 4.0 parts of sodium bicarbonate and 21.2 parts of a 30 wt-% solution of sodium lauryl sulphate (surfactant) were charged.

At 50° C. 0.8 parts of ammonium persulphate dissolved in 3.2 parts of demineralized water, and 10% of a pre-emulsified first monomer feed, consisting of 368.6 parts of demineralized water, 23.8 parts of methacrylic acid, 428.6 parts of dimethyl itaconate, 341.3 parts of 2-octyl acrylate, and 9.0 parts of a 30 wt-% solution of sodium lauryl sulphate, were added to the reactor and its contents were further heated to 70° C.

At around 70° C. the polymerization will start causing the temperature to increase to 85° C. (if this temperature is not reached automatically, the reactor contents should be heated to 85° C.).

At 85° C. the initiator feed, consisting of 89.9 parts of demineralized water, 3.2 parts of ammonium persulphate, and 1.6 parts of a 30 wt-% solution of sodium lauryl sulphate, was started. 5 minutes later feeding the remainder of the monomer feed was commenced. The initiator feed should take 135 minutes, while the monomer feed should be finished after 120 minutes. When the monomer feed was completed, the feed vessel was rinsed with 54.1 parts of demineralized water. After the initiator feed was finished, the mixture was stirred for another 20 minutes at 85° C., after which the batch was cooled to 80° C.

Using a mixture of 10.1 parts of a 25 wt-')/0 solution of ammonia and 19.3 parts of demineralized water (or parts of it), the pH was increased to 7.6 (as measured at 25° C.).

Over a period of 20 minutes an initiator solution was fed to the reactor in 20 minutes, consisting of 4.1 parts of demineralized water, 0.1 part of a 30 wt-% solution of sodium lauryl sulphate, and 0.2 parts of sodium persulphate. Starting 5 minutes later, a second monomer feed was added in 15 minutes, comprising 16.8 parts of demineralized water, 0.4 parts of a 30 wt-% solution of sodium lauryl sulphate, and 36.2 parts of 2-octyl acrylate. After completion of both feeds, the mixture was stirred for 60 minutes at 80° C.

The emulsion was cooled to room temperature after which 5.4 parts of Proxel AQ were added. The pH was checked and when necessary adjusted to 7.5 using a 25 wt-% solution of ammonia in demineralized water. The solids content was checked and adjusted to 45% using 43 parts of demineralized water or part of it. The emulsion was made film forming by drop wise addition of 2 wt-% of butyl glycol according the general recipe shown below.

| | |
|---|---|
| Emulsion | 98 parts |
| Butyl glycol | 2 parts |
| Total | 100 parts |

Example 2: Copolymer Emulsion Comprising 2-OA and DMI/MMA

Example 1 was repeated except that the 428.6 parts of dimethyl itaconate in the first monomer feed was replaced with 269.9 parts of dimethyl itaconate and 158.8 parts of methyl methacrylate.

Comparative Example A: Copolymer Emulsion Comprising 2-OA and MMA

Example 1 was repeated except that the 428.6 parts of dimethyl itaconate in the first monomer feed was replaced with 428.6 parts of methyl methacrylate.

Comparative Example B: Copolymer Emulsion Comprising 2-EHA and DMI

Example 1 was repeated except that the 341.3 parts of the 2-octyl acrylate in the first monomer feed was replaced with 341.3 parts of 2-ethylhexyl acrylate; and the 36.2 parts of the 2-octyl acrylate in the second monomer feed was replaced with 36.2 parts of 2-ethylhexyl acrylate.

Comparative Example C: Copolymer Emulsion Comprising 2-EHA and DMI/MMA

Example 1 was repeated except that (1) the 428.6 parts of the dimethyl itaconate in the first monomer feed was replaced with 269.9 parts of dimethyl itaconate and 158.8 parts of methyl methacrylate; (2) the 341.3 parts of the 2-octyl acrylate in the first monomer feed was replaced with 341.3 parts of 2-ethylhexyl acrylate; and (3) the 36.2 parts of the 2-octyl acrylate in the second monomer feed was replaced with 36.2 parts of 2-ethylhexyl acrylate.

Comparative Example D: Copolymer Emulsion Comprising 2-EHA and MMA

Example 1 was repeated except that (1) the 428.6 parts of dimethyl itaconate in the first monomer feed was replaced with 428.6 parts of methyl methacrylate; (2) the 341.3 parts of the 2-octyl acrylate in the first monomer feed was replaced with 341.3 parts of 2-ethylhexyl acrylate; and (3) the 36.2 parts of the 2-octyl acrylate in the second monomer feed was replaced with 36.2 parts of 2-ethylhexyl acrylate.

Water Resistance Results

With the film forming emulsions of examples 1-2 and Comparative Experiments A-D, films were cast on Leneta card with a wet film thickness of 100 μm and dried to the air for 4 hours. Next, the films were aged in an oven at 50° C. for 16 hours.

Water resistance was tested by putting a drop of water on the aged coating and assessing the damage done to the coating after 1 hr, 6 hrs, and 16 hrs. If no damage at all was observed the water resistance was rated a '5', while a '1' indicated complete removal of the film after removal of the water droplet. Results are shown in Table 1.

TABLE 1

Water resistance results

| Example No. | Water resistance after: | | |
|---|---|---|---|
| | 1 hr. | 6 hrs. | 16 hrs. |
| Ex 1 (DMI + 2-OA) | 5 | 4-5 | 4-5 |
| Ex 2 (DMI/MMA + 2-OA) | 4-5 | 4-5 | 4-5 |
| Comp A (MMA + 2-OA) | 4-5 | 4-5 | 5 |
| Comp B (DMI + 2-EHA) | 3 | 3-4 | 4 |
| Comp C (DMI/MMA + 2-EHA) | 2 | 2 | 3 |
| Comp D (MMA + 2-EHA) | 5 | 5 | 5 |

Comparing the results from Comparative Experiments B and C with those from Comparative Experiment D shows that use of dimethyl itaconate severely reduces the binders resistance to water. While Comparative Experiment D shows excellent water resistance for all three tests, Comparative Experiments B and C show clear marks after the water resistance test.

Comparing the results from Comparative Experiments A and D shows that exchanging 2-ethylhexyl acrylate with 2-octyl acrylate in the absence of dimethyl itaconate does not influence the water resistance.

Comparing the results from examples 1 and 2 with those from Comparative Experiments B and C, however, clearly shows not only a remarkable improvement in water resistance, but in some cases even a water resistance that is close to the perfect score.

Surface Hardness Results

With the film forming emulsions of examples 1-2 and Comparative Experiments A-D, films were cast on glass with a wet film thickness of 100 μm and dried to the air for 4 hours. Next, the films were aged in an oven at 50° C. for 16 hours.

Surface hardness, or König hardness, was determined on the aged films after they were cooled to 25° C. Results are shown in Table 2, together with the MFT's of the emulsions.

TABLE 2

König hardness and MFT

| Example No. | König hardness (s) | MFT (° C.) |
|---|---|---|
| Ex 1 (DMI + 2-OA) | 64 | <5 |
| Ex 2 (DMI/MMA + 2-OA) | 55 | 15 |
| Comp A (MMA + 2-OA) | 91 | 30 |
| Comp B (DMI + 2-EHA) | 43 | <5 |
| Comp C (DMI/MMA + 2-EHA) | 32 | 12 |
| Comp D (MMA + 2-EHA) | 69 | 21 |

Comparing the results from Examples 1, 2, and Comp Ex A with those of Comp Ex B, C and D shows that surface hardness clearly improves upon use of 2-octyl acrylate instead of 2-ethylhexyl acrylate, without affecting MFT significantly. Especially for the examples comprising dimethyl itaconate MFT's are quite similar, while König hardness values are significantly higher for the films comprising 2-octyl acrylate instead of 2-ethylhexyl acrylate.

The invention claimed is:

1. A coating formed of a dried residue of a coating or paint composition comprised of an aqueous polymer emulsion comprising at least 70 wt. % of a vinyl copolymer (A) relative to the total weight amount of polymers present in the emulsion, wherein the vinyl copolymer (A) comprises:
   (I) from 25 to 55 wt. % of 2-octyl acrylate monomer;
   (II) from 20 to 65 wt. % of dimethyl itaconate monomer; and
   (III) from 0 to 55 wt. % of ethylenically unsaturated monomer other than the monomers (I) and (II), wherein the summed amount of monomers (I), (II) and (III) is 100 wt. %, and wherein the monomer (III) comprises:
      (IIIa) from 0.1 to 15 wt. % of carboxylic acid functional olefinically unsaturated monomer;
      (IIIb) from 0 to 5 wt. % of olefinically unsaturated crosslinkable monomer, different from (IIIa), (IIIc) and (IIId);
      (IIIc) from 0 to 5 wt. % of olefinically unsaturated wet adhesion promotor monomer, different from (IIIa), (IIIb) and (IIId);
      (IIId) from 0 to 54.9 wt. % of olefinically unsaturated monomer, different from (IIIa), (IIIb) and (IIIc); wherein
      wherein the amounts of (IIIa), (IIIb), (IIIc) and (IIId) are given relative to the total amount of (I), (II) and (III), and wherein
   the coating exhibits improved water resistance as compared to an identical coating where a 2-ethylhexyl acrylate monomer is employed instead of the 2-octyl acrylate monomer.

2. The coating according to claim 1, wherein the monomer (IIIa) is acrylic acid and/or methacrylic acid.

3. The coating according to claim 1, wherein the monomers (IIIb), (IIIc) and (IIId) are selected from the group consisting of acrylates, methacrylates, arylalkylenes and mixtures thereof.

4. The coating according to claim 1, wherein the monomers (IIId) are selected from the group consisting of methyl (meth)acrylate, ethyl (meth)acrylate, butyl (meth)acrylate, styrene and combinations thereof.

5. The coating according to claim 1, wherein the vinyl copolymer (A) does not contain the monomer (IIIb) and/or the monomer (IIIc).

6. The coating according to claim 1, wherein the coating or paint composition further comprises at least one additional component selected from the group consisting of solvents, pigments, dyes, heat stabilisers, defoamers, fillers, matting agents, UV absorbers and antioxidants.

7. The coating according to claim 6, wherein the coating or paint composition is a one-component, non-crosslinkable composition.

8. A method of coating or painting a substrate comprising applying the coating of the coating or paint composition according to claim 6 to a substrate and causing or allowing an aqueous carrier medium of the emulsion to be removed.

9. The method according to claim 8, wherein the substrate is selected from the group consisting of wood optionally containing a primer and a midcoat, metal, plastic, leather, glass, paper and combinations thereof.

10. A coated or painted substrate obtained by the method of claim 9.

11. The aqueous polymer emulsion according to claim 1, wherein the vinyl copolymer comprises at least 30 wt. % of the 2-octyl acrylate monomer (I).

* * * * *